United States Patent
Dong et al.

(10) Patent No.: US 8,014,133 B2
(45) Date of Patent: Sep. 6, 2011

(54) PENDANT MOUNTING STRUCTURE AND PORTABLE ELECTRONIC DEVICE USING THE SAME

(75) Inventors: Shui-Jin Dong, Shenzhen (CN); Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 122 days.

(21) Appl. No.: 12/549,183

(22) Filed: Aug. 27, 2009

(65) Prior Publication Data

US 2010/0165554 A1    Jul. 1, 2010

(30) Foreign Application Priority Data

Dec. 30, 2008 (CN) .......................... 2008 1 0306682

(51) Int. Cl.
*H05K 7/12* (2006.01)

(52) U.S. Cl. ......... 361/679.01; 361/679.58; 361/679.55; 248/317

(58) Field of Classification Search ............. 361/679.01, 361/679.02, 679.3–679.58; 248/317, 339; 224/930, 255; 292/80, 84, 87
See application file for complete search history.

(56) References Cited

U.S. PATENT DOCUMENTS

| 4,158,197 A * | 6/1979 | Takagaki ....................... 340/574 |
| 2010/0033911 A1* | 2/2010 | Chang et al. ............. 361/679.01 |
| 2010/0035666 A1* | 2/2010 | Chang et al. ............... 455/575.1 |

FOREIGN PATENT DOCUMENTS

WO    WO 2008099792 A1 *   8/2008

\* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A pendant mounting structure comprises a main body, a cantilever and two latching elements. The main body includes a first surface and a second surface opposite to the first surface. The cantilever protrudes from the first surface. The latching elements protrude from the second surface. The pendant mounting is separately manufactured and latched to a housing. Thus, when an external force exerted on the cantilever is more than the offset limit of the cantilever, the cantilever could be cracked to protect the housing from being damaged.

20 Claims, 5 Drawing Sheets

PENDANT MOUNTING STRUCTURE AND PORTABLE ELECTRONIC DEVICE USING THE SAME

BACKGROUND

1. Technical Field

The present disclosure generally relates to pendant mounting structures, particularly to pendant mounting structures used in portable electronic devices.

2. Description of Related Art

Nowadays, users of mobile phone like to equip a pendant for mounting accessories thereon, to add personalization and improve overall appearance of the mobile phone. The pendant is generally hung on a rope, and the housing of the mobile phone has a hole defined for accommodating the rope. When assembling the pendant onto the mobile phone, the rope is firstly entered through the hole, and then ties a knot to secure the pendant to the mobile phone.

However, it is difficult to make the rope enter through the hole as the hole usually is small. In additional, when an external force exerted on the rope is more than the offset limit of the housing, the housing will be damaged.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary pendant mounting structure and portable electronic device using the pendant mounting structure. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
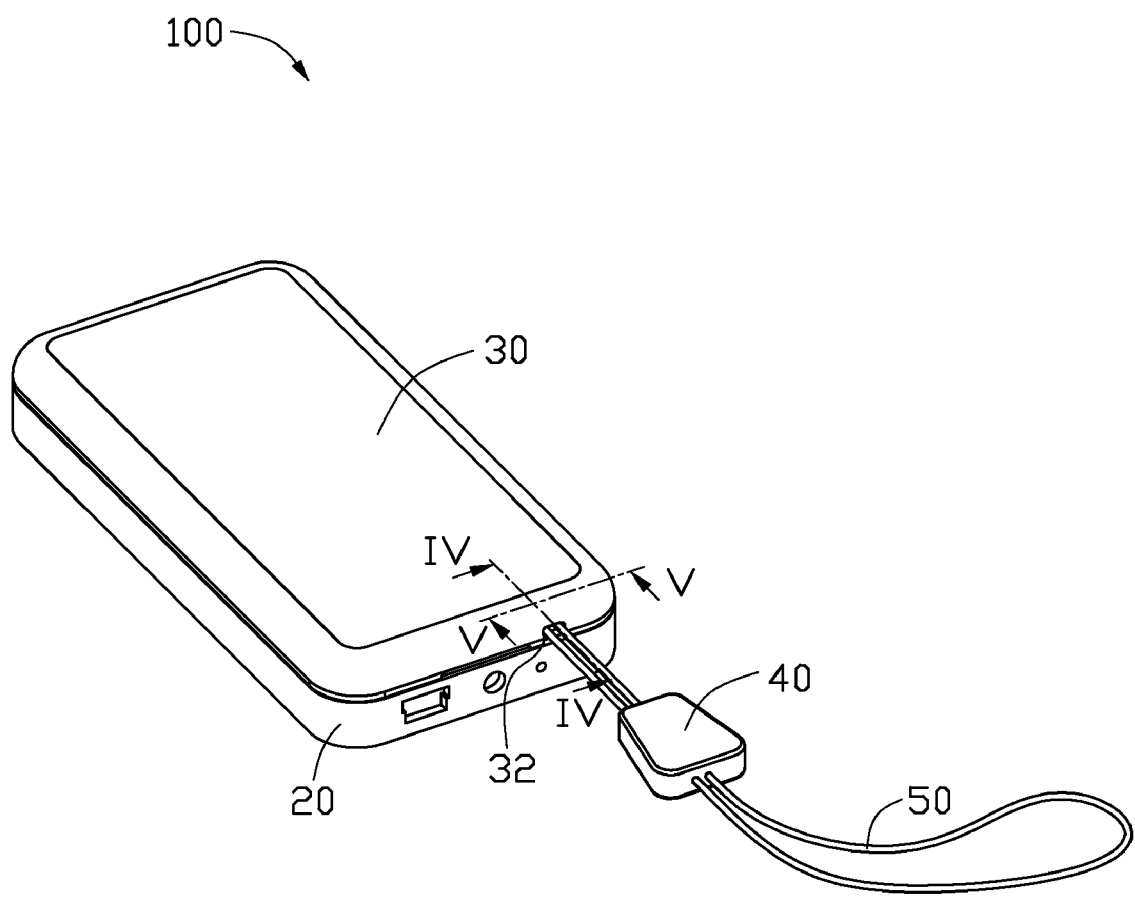
FIG. 1 is an assembled view of an exemplary embodiment of a pendant mounting structure using in a portable electronic device including a pendant mounting structure, a housing and a cover.
Figure 2:
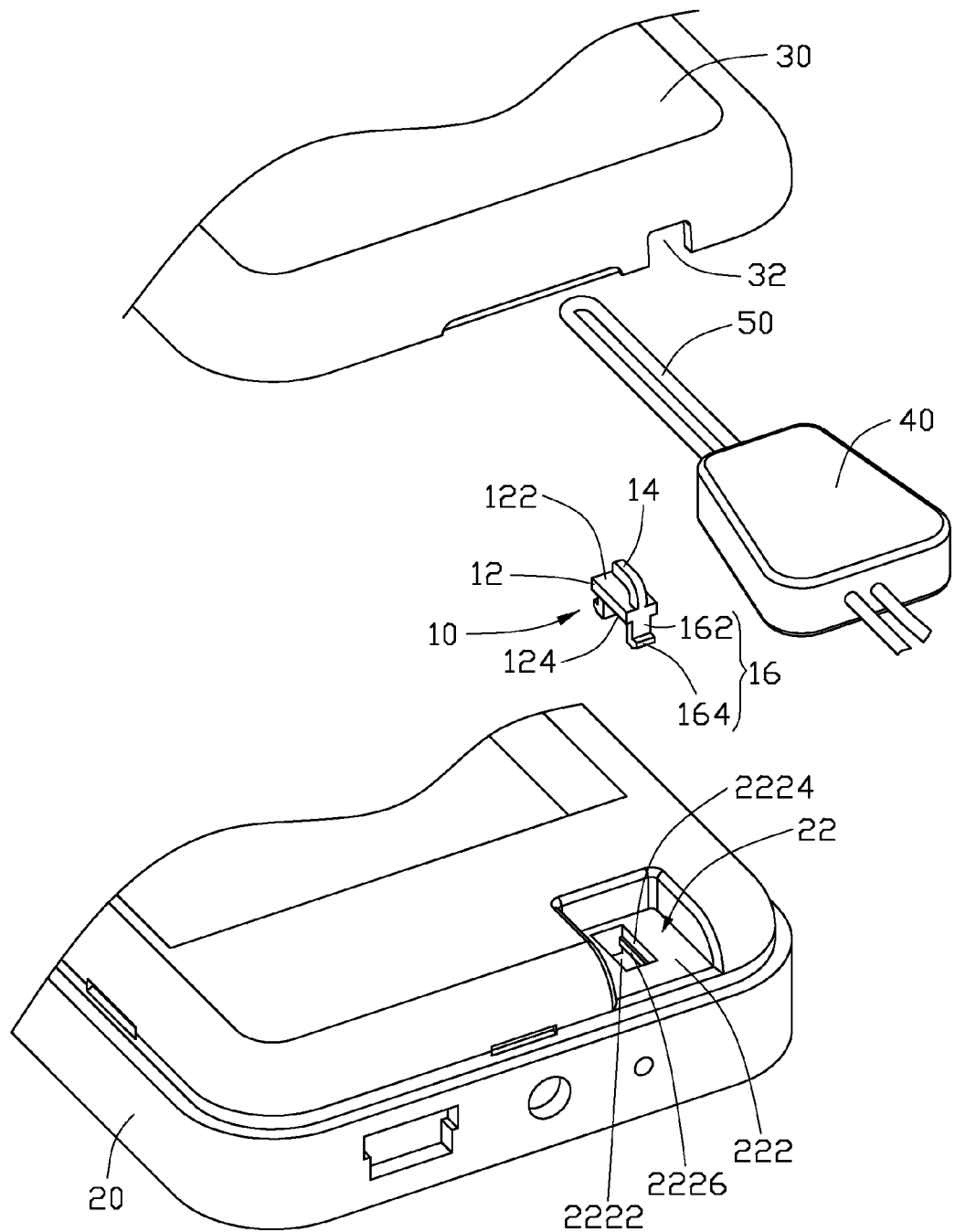
FIG. 2 is an exploded view of the portable electronic device shown in FIG. 1.
Figure 3:
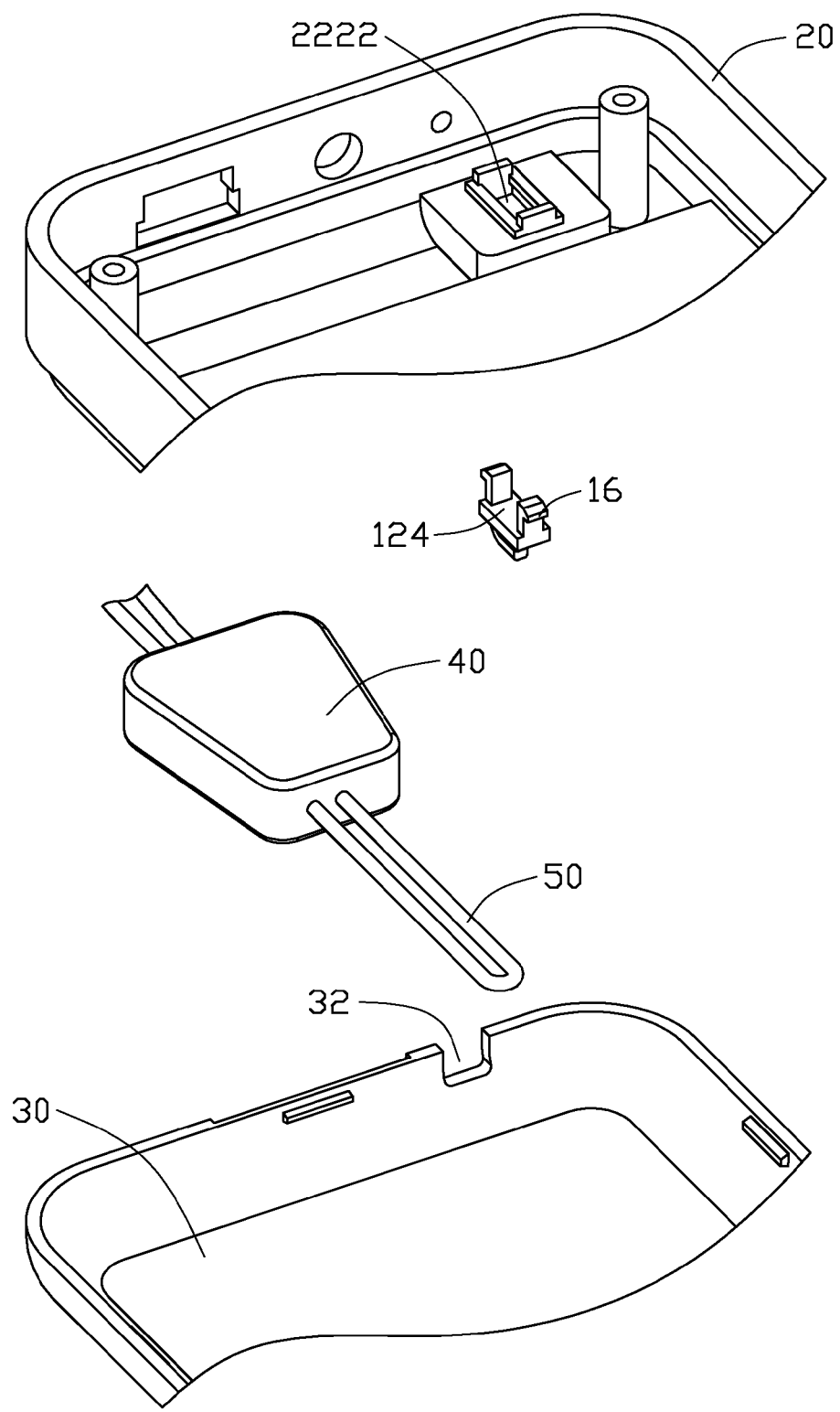
FIG. 3 is similar to FIG. 2, but showing the portable electronic device in another aspect.

Referring to FIGS. 1 to 3, an exemplary pendant mounting structure 10 used in a portable electronic device 100 for hanging a pendant 40 (e.g., decorative element) is shown. The portable electronic device 100 includes a pendant mounting structure 10, a housing 20 and a cover 30. The pendant mounting structure 10 is mounted to the housing 20 for hanging a rope 50 of the pendant 40.

The pendant mounting structure 10 includes a main body 12, a cantilever 14 and two latching elements 16. The main body 12 includes a first surface 122 and a second surface 124 opposite to the first surface 122. The cantilever 14 protrudes from one end of the first surface 122 and extends toward another opposite end of first surface 122 such that a gap 126 is formed between the main body 12 and the cantilever 14 (shown in FIG. 4). The latching elements 16 are two hooks protruding from the second surface 124 and respectively located at two opposite ends of the main body 12. Each latching element 16 is substantially L-shaped. Each latching element 16 includes a connecting portion 162 connecting with the main body 12 and a latching portion 164 extending outwardly from a distal end of the connecting portion 162.

The housing 20 has a mounting portion including a slot 22 defined therein corresponding to the pendant mounting structure 10, and a hole 2222 defined through a bottom wall 222 of the slot 22. The hole 2222 has the same shape and size as the main body 12 of the pendant mounting structure 10. The hole 2222 is configured to accommodate the main body 12. The housing 20 further has two opposite inner surfaces 2224 defined in the hole 2222, and each inner surface 2224 has a block 2226 protruding therefrom toward another inner surface 2224. The blocks 2226 are configured as stopping member for stopping the main body 12 passing through the hole 2222.

The cover 30 has a notch 32 defined therethrough corresponding to the slot 22. When the cover 30 is mounted to the housing 20, the notch 32 is aligned with the slot 22, so that the rope 50 can extend outwardly from the notch 32.

Figure 4:
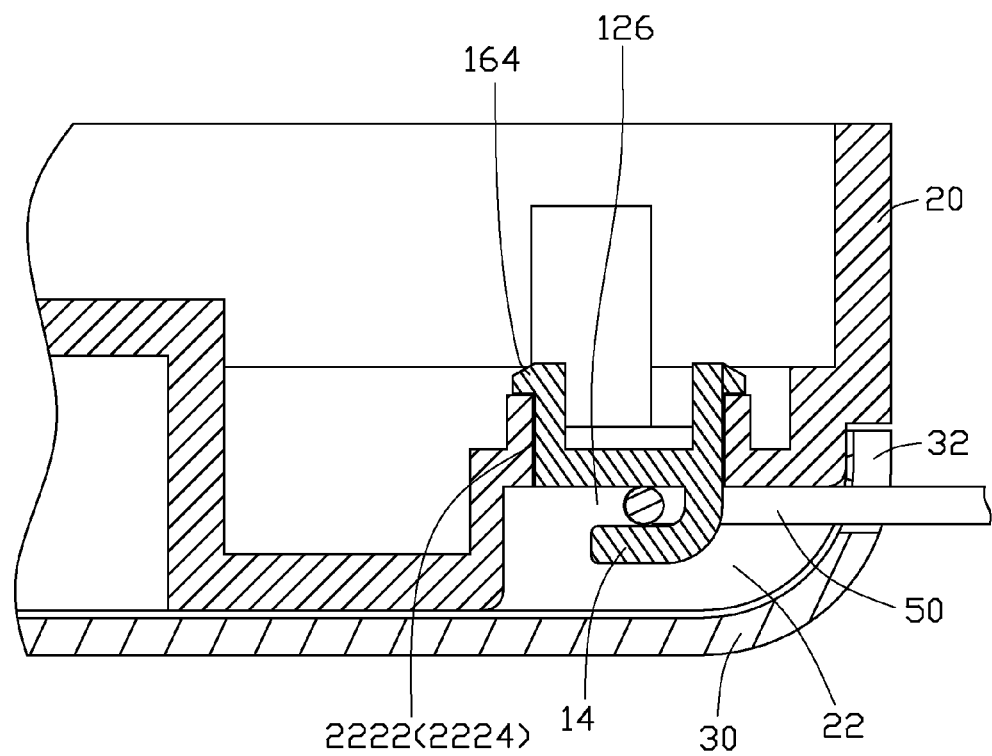
FIG. 4 is a partially enlarged and cross-sectional view of the portable electronic device shown in FIG. 1 along the line of IV-IV.
Figure 5:
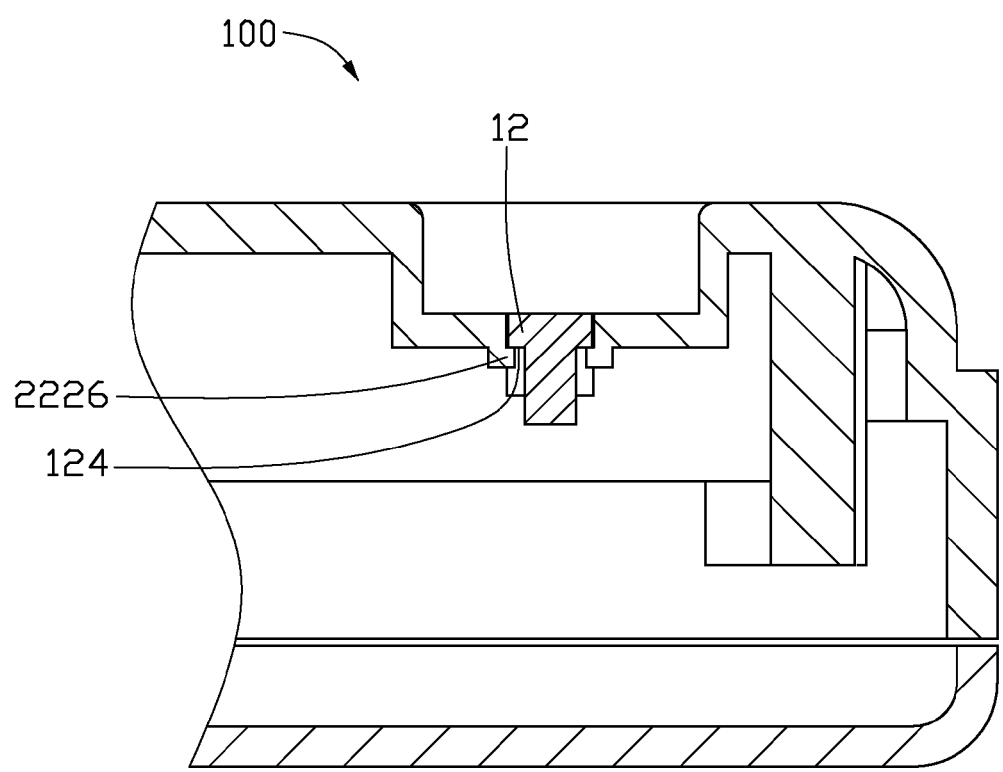
FIG. 5 is a partially enlarged and cross-sectional view of the portable electronic device shown in FIG. 1 along the line of V-V.

Referring to FIG. 4, during assembling the portable electronic device 100, firstly, the latching elements 16 are pressed toward each other to facilitate the latching elements 16 passing through the hole 2222. Secondly, the latching elements 16 are aligned with and pushed into the hole 2222. At this time, the latching elements 16 are compressed as being resisted against two opposite inner surfaces of the hole 2222. Once the latching portions 164 of the latching elements 16 entirely pass through the hole 2222, the latching elements 16 returns to the original shape so that the latching portions 164 latch with the housing 20. Additionally, the main body 12 resists against the blocks 2226 to stop the main body 12 passing through the hole 2222. Thus, the pendant mounting structure 10 is firmly mounted to the housing 20.

After that, the rope 50 is wound on the cantilever 14 of the pendant mounting structure 10. The cover 30 is mounted to the housing 20, i.e., yielding an assembled portable electronic device 100.

The pendant mounting structure 10 is separately manufactured and latched to the housing 20. When an external force exerted on the rope 50 is more than the offset limit of the cantilever 14, the cantilever 14 could be cracked to protect the housing 20 from being damaged.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
    a housing; and
    a pendant mounting structure used to hanging a pendant onto the housing, the pendant mounting structure comprising:
    a main body, the main body including a first surface and a second surface opposite to the first surface;

a cantilever, the cantilever protruding from the first surface and configured for hanging the pendant; and two latching elements, the latching elements protruding from the second surface;

wherein when the latching elements are latched with the housing, the main body resists against the housing to latch the pendant mounting structure to the housing.

2. The portable electronic device as claimed in claim 1, wherein the cantilever protruding one end of the main body and extend toward another end of the main body such that a gap is formed between the main body and the cantilever.

3. The portable electronic device as claimed in claim 1, wherein the latching elements are hooks protruding from the main body.

4. The portable electronic device as claimed in claim 3, wherein each hook includes a connecting portion protruding from the second surface and a latching portion extending outwardly from a distal end of the connecting portion.

5. The portable electronic device as claimed in claim 4, wherein the hooks are respectively located at two opposite ends of the main body.

6. The portable electronic device as claimed in claim 1, wherein the housing has a hole defined therein corresponding to the pendant mounting structure, the hole has the same shape and size as the main body, the main body accommodated in the hole.

7. The portable electronic device as claimed in claim 6, wherein the latching portions pass through the holes to latch with the housing.

8. The portable electronic device as claimed in claim 6, wherein the housing has two inner surfaces defined in the hole, each inner surface having a stopping member protruding therefrom toward to another said inner surface, the stopping members resist against the second surface of the main body when the latching elements are latched with the housing to latch the pendant mounting structure to the housing.

9. The portable electronic device as claimed in claim 8, wherein the stopping members are blocks respectively protruding from the inner surfaces.

10. The portable electronic device as claimed in claim 6, wherein the housing has a slot defined therein corresponding to the pendant mounting structure, so a bottom wall defined in the slot, the hole is defined through the bottom wall in the slot.

11. The portable electronic device as claimed in claim 10, wherein the portable electronic device further includes a cover mounted to the housing, the cover has a notch defined therethrough corresponding to the slot, the notch is aligned with the slot when the cover is mounted to the housing.

12. A portable electronic device, comprising:
a housing; and
a pendant mounting structure used to hanging a pendant onto the housing, the pendant mounting structure comprising:
a main body, the main body including a first surface and a second surface opposite to the first surface;
a cantilever, the cantilever protruding from the first surface and configured for hanging the pendant; and
two latching elements, the latching elements protruding from the second surface;
wherein the latching elements are latched with the housing, the main body resists against the housing, which corporately non-movably latch the pendant mounting structure to the housing.

13. The portable electronic device as claimed in claim 12, wherein the cantilever protruding one end of the main body and extend toward another end of the main body such that a gap is formed between the main body and the cantilever.

14. The portable electronic device as claimed in claim 12, wherein the latching elements are hooks protruding from the main body.

15. The portable electronic device as claimed in claim 14, wherein each hook includes a connecting portion protruding from the second surface and a latching portion extending outwardly from a distal end of the connecting portion.

16. The portable electronic device as claimed in claim 15, wherein the hooks are respectively located at two opposite ends of the main body.

17. The portable electronic device as claimed in claim 12, wherein the housing has a hole defined therein corresponding to the pendant mounting structure, the hole has the same shape and size as the main body, the main body accommodated in the hole.

18. The portable electronic device as claimed in claim 17, wherein the latching portions pass through the holes to latch with the housing.

19. The portable electronic device as claimed in claim 17, wherein the housing has two inner surfaces defined in the hole, each inner surface having a stopping member protruding thereform toward to another said inner surface, the stopping members resist against the second surface of the main body when the latching elements are latched with the housing so the pendant mounting structure is non-movably latched to the housing.

20. The portable electronic device as claimed in claim 19, wherein the stopping members are blocks respectively protruding from the inner surfaces.

\* \* \* \* \*